(12) United States Patent
Wang

(10) Patent No.: US 10,716,179 B1
(45) Date of Patent: Jul. 14, 2020

(54) SINGLE FIRE-WIRE BI-DIRECTIONAL POWER FETCHING AND DIMMER CONTROL SYSTEM

(71) Applicant: LOONG YEE INDUSTRIAL CORP., LTD., New Taipei (TW)

(72) Inventor: Chi-Jen Wang, New Taipei (TW)

(73) Assignee: LOONG YEE INDUSTRIAL CORP., LTD., New Taipei (TW)

( * ) Notice: Subject to any disclaimer, the term of this patent is extended or adjusted under 35 U.S.C. 154(b) by 0 days.

(21) Appl. No.: 16/413,582

(22) Filed: May 15, 2019

(51) Int. Cl.
*H02P 27/04* (2016.01)
*H05B 45/10* (2020.01)
*H05B 45/37* (2020.01)

(52) U.S. Cl.
CPC ............. *H05B 45/10* (2020.01); *H05B 45/37* (2020.01); *H02P 27/04* (2013.01)

(58) Field of Classification Search
None
See application file for complete search history.

(56) References Cited

U.S. PATENT DOCUMENTS

| | | | | |
|---|---|---|---|---|
| 5,003,230 A | * | 3/1991 | Wong | H05B 41/28 315/279 |
| 5,089,751 A | * | 2/1992 | Wong | H05B 41/28 315/279 |
| 6,059,410 A | * | 5/2000 | Wang | G02C 3/04 351/111 |
| 7,099,132 B2 | * | 8/2006 | Moisin | H05B 39/048 315/DIG. 4 |
| 7,701,153 B2 | * | 4/2010 | Itou | H05B 41/2983 315/363 |
| 8,053,924 B2 | * | 11/2011 | Wang | H02M 5/293 307/31 |
| 8,482,228 B2 | * | 7/2013 | Itou | H05B 45/37 315/363 |
| 8,922,133 B2 | * | 12/2014 | Hausman, Jr. | H02J 7/00 315/291 |
| 8,941,328 B2 | * | 1/2015 | Wu | H05B 45/395 315/307 |
| 8,942,018 B2 | * | 1/2015 | Ho | H02M 7/217 363/126 |
| 9,345,112 B2 | * | 5/2016 | Chen | H03K 17/133 |
| 9,418,809 B2 | * | 8/2016 | Hausman, Jr. | H02M 5/293 |

(Continued)

*Primary Examiner* — Amy Cohen Johnson
*Assistant Examiner* — Srinivas Sathiraju
(74) *Attorney, Agent, or Firm* — Chun-Ming Shih

(57) ABSTRACT

A single fire-wire bi-directional power fetching and dimmer control system, comprising: a dimmer circuit, that includes at least a dimmer driver and two connected bi-directional power electronic components; a single fire-wire bi-directional power fetching module, connected in series between the two bi-directional power electronic components, to perform single fire-wire power fetching when the dimmer circuit is conducting; a high side buck, connected in parallel to the dimmer circuit; and a DC to DC converter, with input end of the converter used for fetching power connected to the single fire-wire bi-directional power fetching module, and the high side buck; and with output end of the converter used for supplying power connected to the dimmer driver of the dimmer circuit. As such, single fire-wire bi-directional dimming can be performed, to raise significantly its range of control, while fetching enough power to drive Wi-Fi and 5G communication.

10 Claims, 8 Drawing Sheets

(56) References Cited

U.S. PATENT DOCUMENTS

| | | | | |
|---|---|---|---|---|
| 9,497,834 B2* | 11/2016 | Chen | | H03K 17/133 |
| 9,535,443 B1* | 1/2017 | Wang | | G05F 3/04 |
| 9,685,783 B2* | 6/2017 | Raneri | | H01R 13/6683 |
| 9,837,928 B1* | 12/2017 | Wang | | H02M 5/257 |
| 10,148,197 B2* | 12/2018 | Maeda | | H02M 7/5387 |
| 2010/0007405 A1* | 1/2010 | Wang | | H03K 17/945 |
| | | | | 327/517 |
| 2012/0025802 A1* | 2/2012 | Carmen | | H05B 45/37 |
| | | | | 323/320 |
| 2013/0147351 A1* | 6/2013 | Trainor | | G01R 31/44 |
| | | | | 315/86 |
| 2014/0145616 A1* | 5/2014 | Goscha | | H01J 5/54 |
| | | | | 315/85 |
| 2015/0180354 A1* | 6/2015 | Sadwick | | H02M 3/33515 |
| | | | | 363/21.13 |
| 2016/0028320 A1* | 1/2016 | Knode | | H02M 5/04 |
| | | | | 315/291 |
| 2016/0363951 A1* | 12/2016 | Wang | | H05B 39/08 |
| 2017/0006683 A1* | 1/2017 | Shiyu | | H05B 45/37 |
| 2019/0021154 A1* | 1/2019 | Sadwick | | F21V 23/0471 |
| 2019/0261492 A1* | 8/2019 | Chen | | H03K 17/56 |
| 2019/0320515 A1* | 10/2019 | Sadwick | | H05B 47/11 |

\* cited by examiner

SINGLE FIRE-WIRE BI-DIRECTIONAL POWER FETCHING AND DIMMER CONTROL SYSTEM

BACKGROUND OF THE INVENTION

Field of the Invention

The present invention relates to the technology of power fetching, and in particular to a single fire-wire bi-directional power fetching and dimmer control system.

The Prior Arts

Presently, with regard to power fetching for the local AC power supply of 50 Hz or 60 Hz, various designs have been proposed, so that the power fetching circuit can be connected speedily to the local power supply for a short period of a cycle, to obtain an instantaneous AC current. Then, that current is rectified into a basic power supply, and is supplied to an outside circuit. However, all these designs lack the synchronous function, such that the power fetching circuit thus designed has quite a lot of shortcomings and deficiencies.

To improve the drawbacks just mentioned, a series of improvements have been proposed as explained as follows: "an improved structure for a series connection synchronous power fetching device", "sensor type control switch having power fetching function", and "flicker prevention lamp illumination system and constant current source load making use of the same", and all these efforts and improvements mentioned above contribute to achieve the optimal application results for power fetching. As such, it can be connected in series to the fire-wire of power supply, to perform synchronous power fetching periodically, and to provide synchronous and stable DC power to an outside circuit as the basic power supply. In addition, this kind of design eliminates the need to provide batteries to save cost, while preventing the hazard of battery pollution, and the trouble of rearranging Neutral Lines.

In this regard, presently, the most advanced technology of a new generation is related to "bi-directional dynamic full-bridge type power fetching". Wherein, on a single fire-wire, power fetching can be performed twice in a cycle of AC. The duration of power fetching can be regulated automatically depending on the load, to adjust automatically the compensation power. The major characteristic of this is that, it is able to provide DC power of at least 3.3V/350 mA. However, though that is sufficient for the most basic WiFi, sensor, or communication module requiring the same amount of power to run, yet it can not meet the power demand of lamp light illumination for intelligent web adjustment at the same time.

The reason for this is that, at present, in a single fire-wire phase-front dynamic power fetching module, a Triac is used as a light adjusting and control element. As shown in FIG. 6, it utilizes Leading-Edge-Phase-Control, to control the conduction cycle ratio of AC power supplied to a lamp. In case it is required to adjust light illumination through web intelligent adjustment, then a light adjusting circuit has to be added to the Internet of Things (IoT). And then, a high-end wireless communication module must also be included. At this time, the power required for the above is raised accordingly. For a single fire-wire dimming, the only way of increasing the power supplied is to limit and reduce dimming cycle ratio from 85% to 75%, to convert the remaining 25% AC power into DC power, so as to meet the power demand for the high-end wireless communication module. Yet, even by adopting this approach, it can only provide power having a current of about 30 mA. Though that may be sufficient for the basic and ordinary wireless communication module to run, yet it is not capable of meeting power demand of current 450 mA for Wifi and high-end wireless communication module having dimmer circuit for the future 5G communications.

Since the design of WiFi/5G module dimmer circuit is rather difficult, thus a Neutral Line has to be connected to provide stable power supply. In addition, for the lamp light illumination adjustment, the flickering problem of lamp has also to be overcome. Therefore, right now, there is an urgent task for the people in this field to overcome this technical bottleneck regarding providing sufficient power for the Internet of Things (IoT) and the intelligent dimmer control system through using the single fire-wire technology.

Therefore, presently, the design and performance of the power fetching system is not quite satisfactory, and it leaves much room for improvement.

SUMMARY OF THE INVENTION

In view of the problems and drawbacks of the prior art, the present invention provides a single fire-wire bi-directional power fetching and dimmer control system, to overcome the shortcomings of the prior art in that, the conventional single fire-wire power fetching is not able to produce sufficient power for the Internet-of-Things (IoT) and the intelligent light control system.

The present invention provides a single fire-wire bi-directional power fetching and dimmer control system, that includes: a dimmer circuit, a single fire-wire bi-directional power fetching module, a high side buck, and a DC to DC converter. The dimmer circuit is connected in series with a single fire-wire, the dimmer circuit includes a dimmer driver, and two connected bi-directional power electronic components.

Wherein, one of the bi-directional power electronic components is disposed on an input end of the single fire-wire, and the other bi-directional power electronic component is disposed on an output end of the single fire-wire. Through using the two bi-directional power electronic components, the positive wave and the negative wave of AC can be used to perform phase conduction adjustment.

The single fire-wire bi-directional power fetching module is connected in series with the dimmer circuit, and is disposed between the two bi-directional power electronic components, to perform single fire-wire power fetching when the dimmer circuit is conducting.

The high side buck is connected in parallel to the dimmer circuit, with one end of the converter circuit disposed on the input end of the single fire-wire connected to one of the two bi-directional power electronic components, and with the other end of the converter circuit disposed on the output end of the single fire-wire connected to the other of the two bi-directional power electronic components, to provide high voltage AC, and convert it into lower voltage DC.

The DC to DC converter, with an input end of the converter used for fetching power connected to the single fire-wire bi-directional power fetching module, and the high side buck; and with an output end of the converter used for supplying power connected to the dimmer driver of the dimmer circuit, is used to perform single fire-wire bi-directional light adjustment, to provide power conversion for DC of various different voltages.

In this way, the single fire-wire bi-directional dimming can be performed, to raise the ranges of control significantly, such that the dimmer cycle ratio can be controlled to reach 15% to 95%, or even 100% when it is required. The power fetched is at least DC 3.3 v/450 mA, to provide sufficient power to operate Wi-Fi, 5G; to be able to meet the power demand for the Internet-of-Things (IoT) and the intelligent light control system.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

Figure 1:
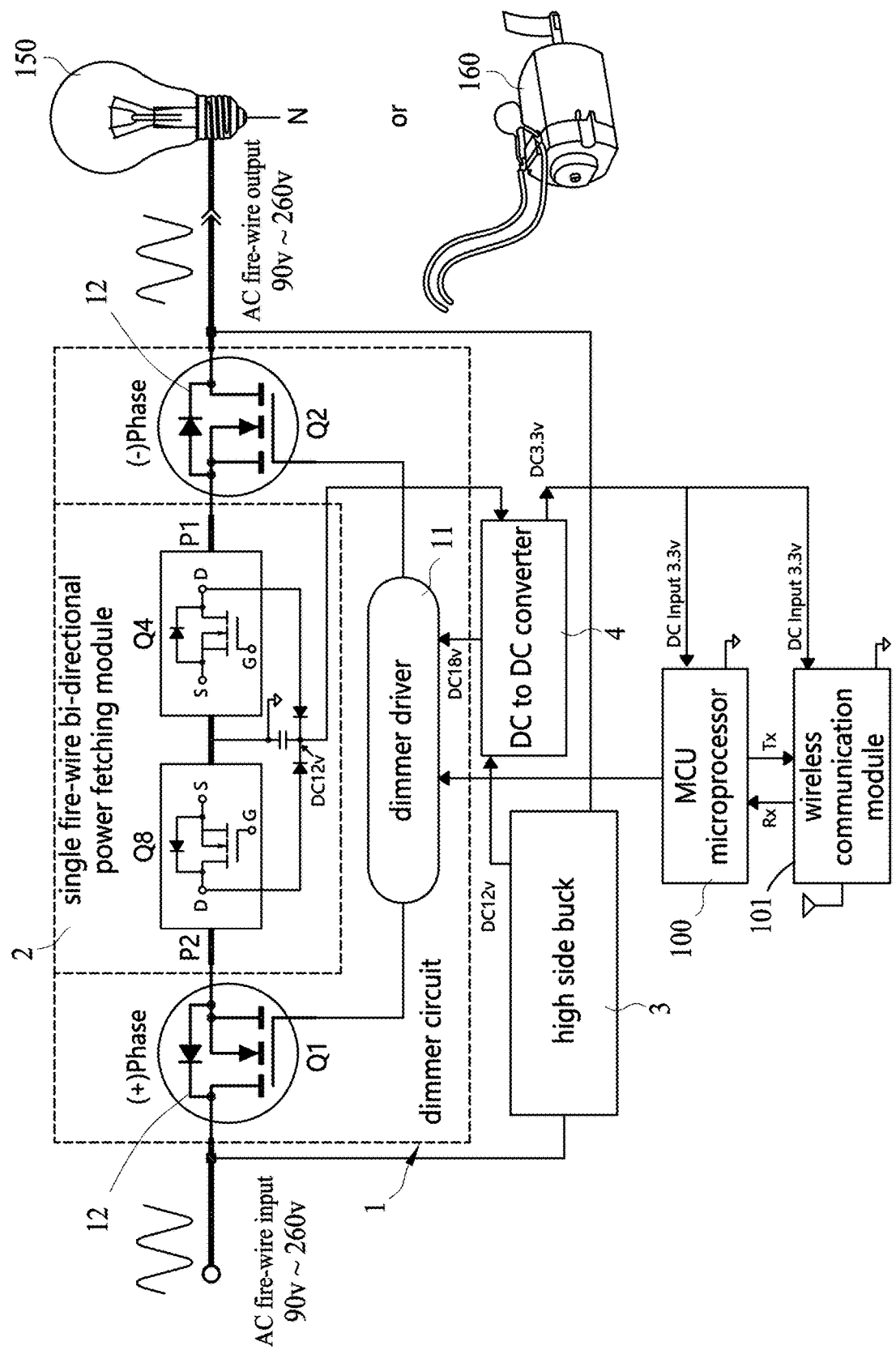
FIG. 1 is an equivalent circuit diagram of a single fire-wire bi-directional power fetching and dimmer control system according to the present invention.
Figure 2:
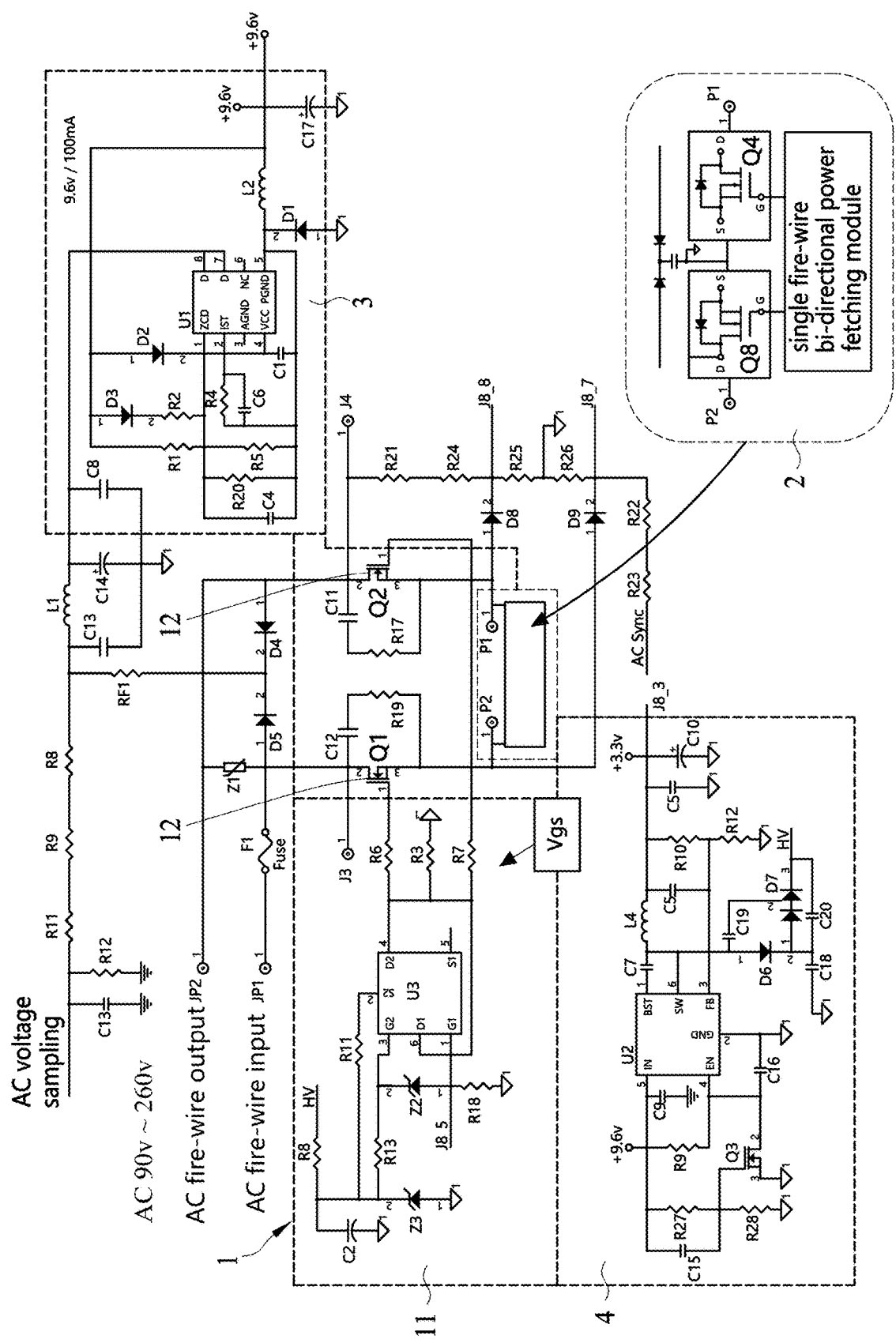
FIG. 2 a circuit diagram of a single fire-wire bi-directional power fetching and dimmer control system according to the present invention.

The purpose, construction, features, functions and advantages of the present invention can be appreciated and understood more thoroughly through the following detailed descriptions with reference to the attached drawings.

Refer to FIGS. 1 to 6 respectively for an equivalent circuit diagram of a single fire-wire bi-directional power fetching and dimmer control system according to the present invention; a circuit diagram of a single fire-wire bi-directional power fetching and dimmer control system according to the present invention; a functional block diagram of a single fire-wire bi-directional power fetching module according to the present invention; a circuit diagram of a single fire-wire bi-directional power fetching and dimmer control system in operation according to the present invention; a waveform diagram for a single fire-wire dimming cycle 15% according to the present invention; a waveform diagram for a single fire-wire dimming cycle 50% according to the present invention; a waveform diagram for a single fire-wire dimming cycle 90% according to the present invention; and a waveform diagram of a single fire-wire reduced dynamic power fetching for an LED light according to the present invention.

As shown in FIGS. 1 to 5C, the present invention provides a single fire-wire bi-directional power fetching and dimmer control system, that includes: a dimmer circuit 1, a single fire-wire bi-directional power fetching module 2, a high side buck 3, and DC to DC converter 4. The dimmer circuit 1 is connected in series with a single fire-wire, the dimmer circuit 1 includes at least a dimmer driver 11, and two bi-directional power electronic components 12 connected thereto.

Wherein, one of the bi-directional power electronic components 12 is disposed on an input end of the single fire-wire, and the other bi-directional power electronic component 12 is disposed on an output end of the single fire-wire. Through using the two bi-directional power electronic components, both the positive wave AC and the negative wave AC can be used to perform phase conduction adjustment.

The single fire-wire bi-directional power fetching module 2 is connected in series with the dimmer circuit 1, and is disposed between the two bi-directional power electronic components 12, to perform single fire-wire power fetching when the dimmer circuit 1 is conducting.

The high side buck 3 is connected in parallel to the dimmer circuit 1, with one end of the high side buck 3 disposed on the input end of the single fire-wire connected to one of the two bi-directional power electronic components 12; and with the other end of the high side buck 3 disposed on the output end of the single fire-wire connected to the other of the two bi-directional power electronic components 12, to provide high voltage AC, to be converted to lower voltage DC.

The DC to DC converter 4, with an input end of the converter used for fetching power connected to the single fire-wire bi-directional power fetching module 2, and the high side buck 3; and with an output end of the converter used for supplying power connected to the dimmer driver 11 of the dimmer circuit 1, is used to perform single fire-wire bi-directional dimming, and to perform power conversion to obtain DC of various different voltages.

According to an embodiment, two bi-directional power electronic components 12 are formed respectively by two separate high voltage high power Metal-Oxide-Semiconductor Field-Effect-Transistors (MOSFETs) Q1 and Q2, and the dimmer driver 11 is an MOSFET dimmer driver. The DC to DC converter 4 provides power of direct current (DC) 18 V to the dimmer driver 11. The dimmer driver 11 is controlled by a Microcontroller Unit (MCU) microprocessor 100, and the MCU microprocessor 100 obtains its power from the DC to DC converter 4. The power provided by the DC to DC converter 4 to the MCU microprocessor 100 may reach DC of 3.3v/450 mA.

Figure 5A:
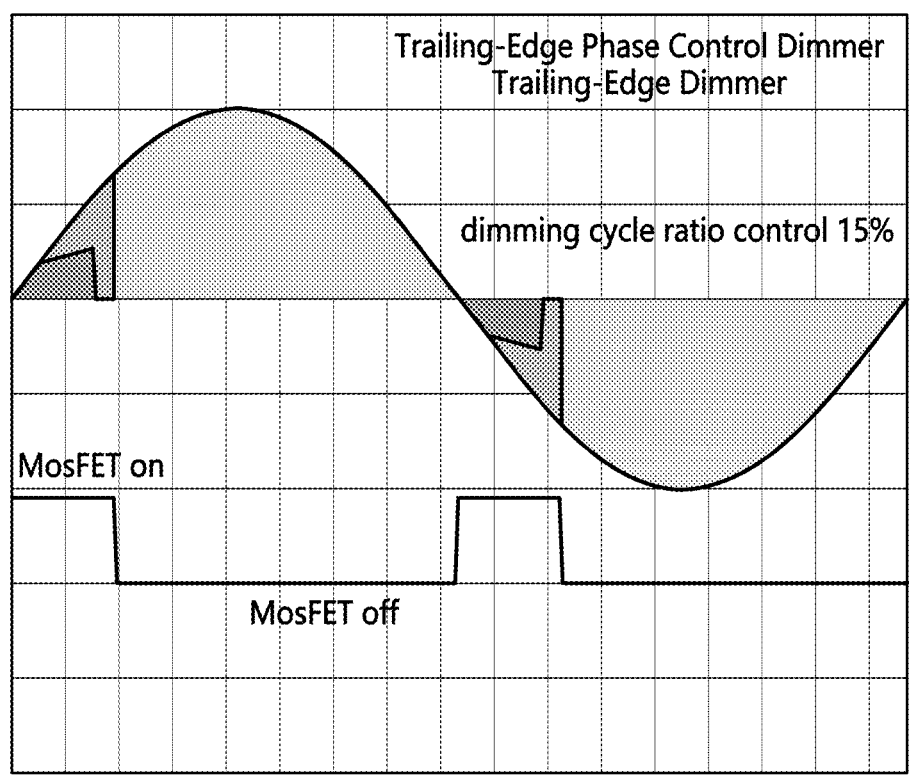
FIG. 5A is a waveform diagram for a single fire-wire dimming cycle 15% according to the present invention.
Figure 5B:
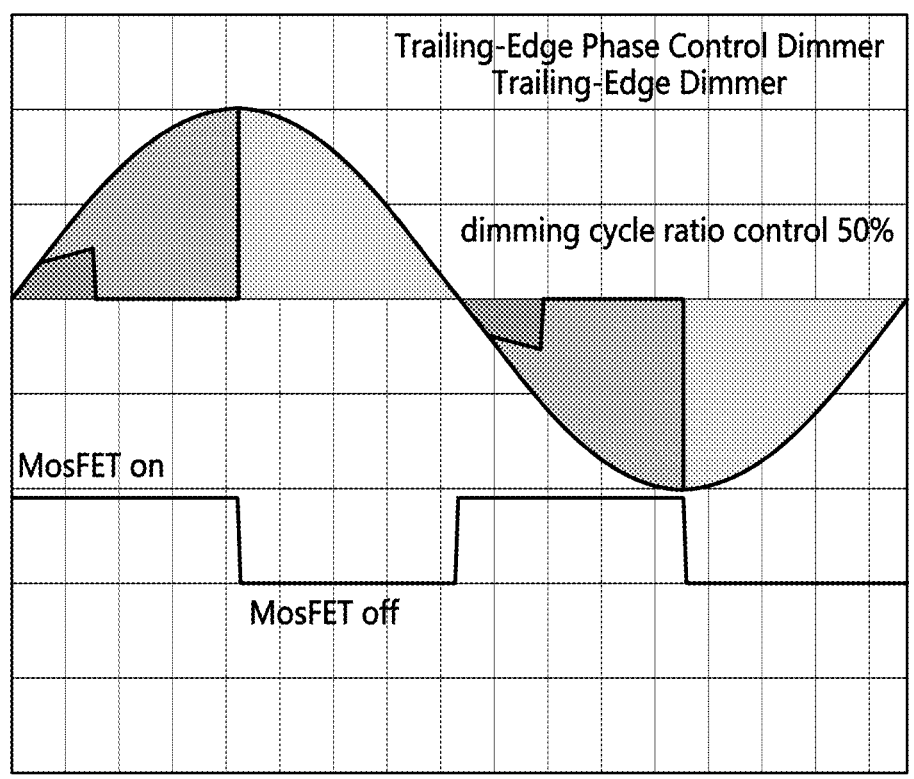
FIG. 5B is a waveform diagram for a single fire-wire dimming cycle 50% according to the present invention.
Figure 5C:
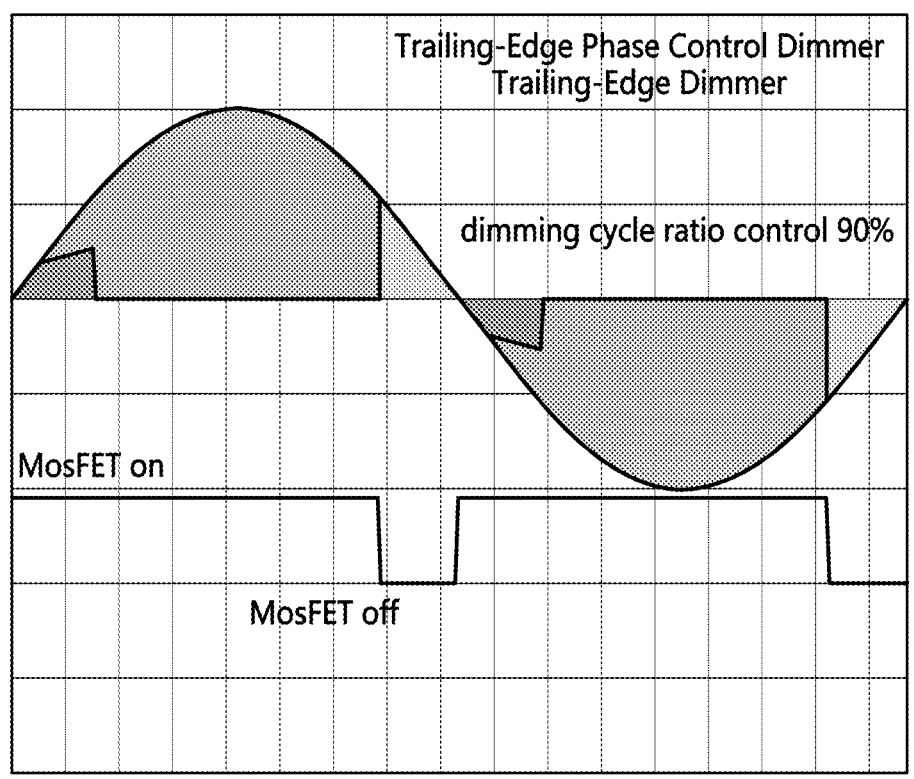
FIG. 5C is a waveform diagram for a single fire-wire dimming cycle 90% according to the present invention.
Figure 6:
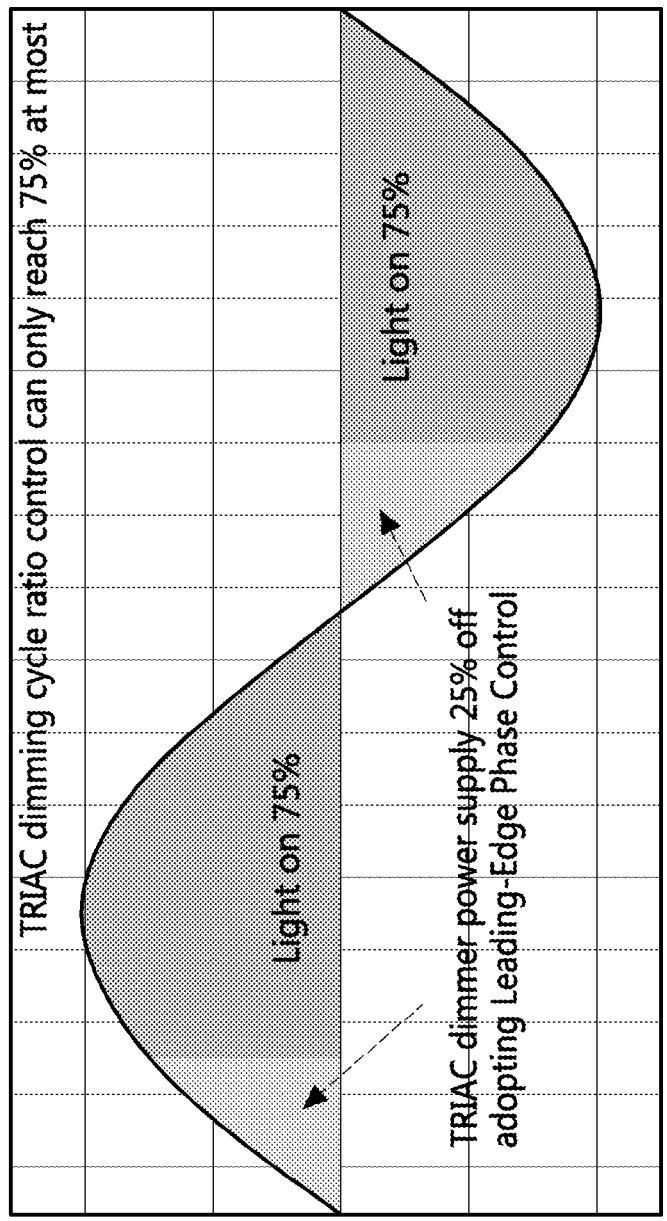
FIG. 6 is a waveform diagram of a single fire-wire reduced dynamic power fetching for an LED light according to the present invention.

As shown in FIGS. 5A to 5C, the dimmer driver 11 is able to generate VGS waveform under the direction of the MCU microprocessor 100, to control and drive synchronously MOSFETs Q1 and Q2 of the two bi-directional power electronic components 12 into conduction, to make adjustment in the curve of sine waves. Through controlling the waveform width and the relative position of the VGS waveform, the amount of the adjusted power can be determined.

Figure 3:
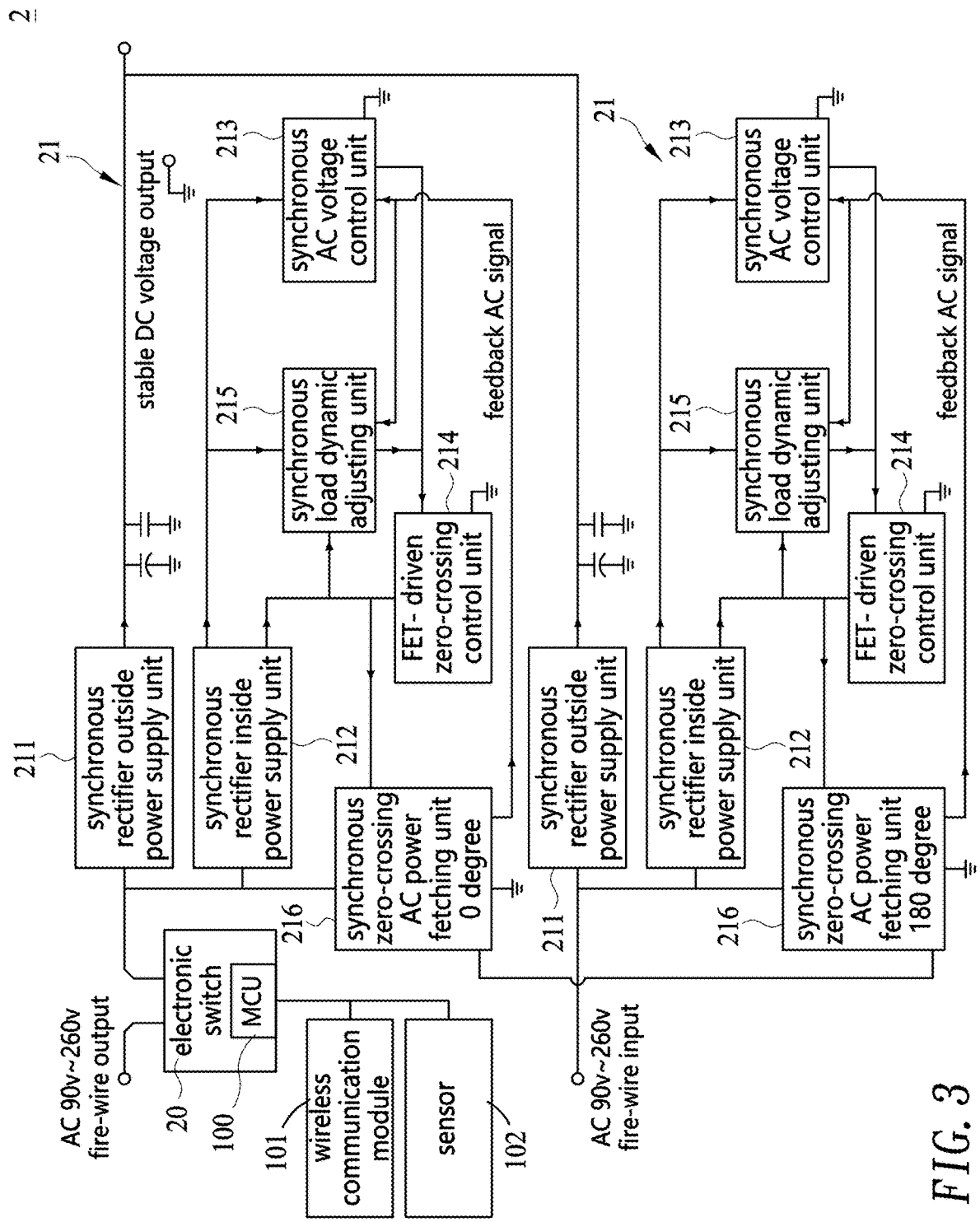
FIG. 3 is a functional block diagram of a single fire-wire bi-directional power fetching module according to the present invention.

As shown in FIG. 3, a wireless communication module 101 can be added to the MCU microprocessor 100, such that the wireless communication module 101 is one of the following: a Blue Tooth wireless module, a Zigbee wireless module, a Z-wave wireless module, a RF2.4G, 3G, 4G, 4.5G and 5G wireless module, a 433 MHz wireless module, and a Wi-Fi wireless web module.

Also, as shown in FIG. 3, the single fire-wire bi-directional power fetching module 2 mainly includes: two series connected synchronous power fetching circuits 21, and an electronic switch 20 connected thereto. The electronic switch 20 is controlled by the MCU microprocessor 100, but the present invention is not limited to this. In theory, different kinds of MCU can be used to achieve control (not shown). As such, one of the two series connected synchronous power fetching circuits 21 is made to perform positive (+) phase AC power fetching, while the other one of the two series connected synchronous power fetching circuits 21 is made to perform negative (−) phase AC power fetching.

Each of the two series-connected synchronous power fetching circuits 21 includes: a synchronous rectifier outside power supply unit 211, a synchronous rectifier inside power supply unit 212, a synchronous AC voltage control unit 213, an FET-driven zero-crossing control unit 214, a synchronous load dynamic adjusting unit 215, and a synchronous zero-crossing AC power fetching unit 216. For the various circuits described and mentioned above, since they are not the key points of the present invention, the details of which will not be repeated here for brevity.

In the present invention, for a single fire-wire, when the dimmer circuit 1 is conducting, bi-directional dynamic full-bridge type power fetching effect can be realized, and is performed twice in a cycle of AC. The duration of power fetching can be regulated automatically depending on the load, to adjust automatically the compensation power. As such, in addition to being a basic power supply of the system, it is able to provide stable DC power output of at least 3.3V/450 mA, to meet the power requirement of Wi-Fi, 5G; sensor 102, and wireless communication module 101 requiring the similar amount of power. Sensor signals can be used to control the dimmer circuit 1 to act. Meanwhile, there is no need to install batteries thus achieving cost effectiveness, while battery pollution is prevented, and there is no need to add an additional Neutral line to achieve stable power output.

Subsequently, as shown in FIGS. 1 to 5C, in application, through the effective combination and cooperation of the dimmer circuit 1, the single fire-wire bi-directional power fetching module 2, the high side buck 3, and the DC to DC converter 4, the system is able to perform Trailing-edge Phase Control directly on the single fire-wire, to raise the overall dimming power supply efficiency significantly. As evidenced by the experiment data, it is proved that, the dimming cycle ratio of the dimmer circuit 1 can be controlled to reach in a range of 15% to 95%, and it may even reach 100%. As such, the effect of the present invention far exceeds that of the Prior Art of using Triac to perform Leading-edge Phase Control.

Figure 4:
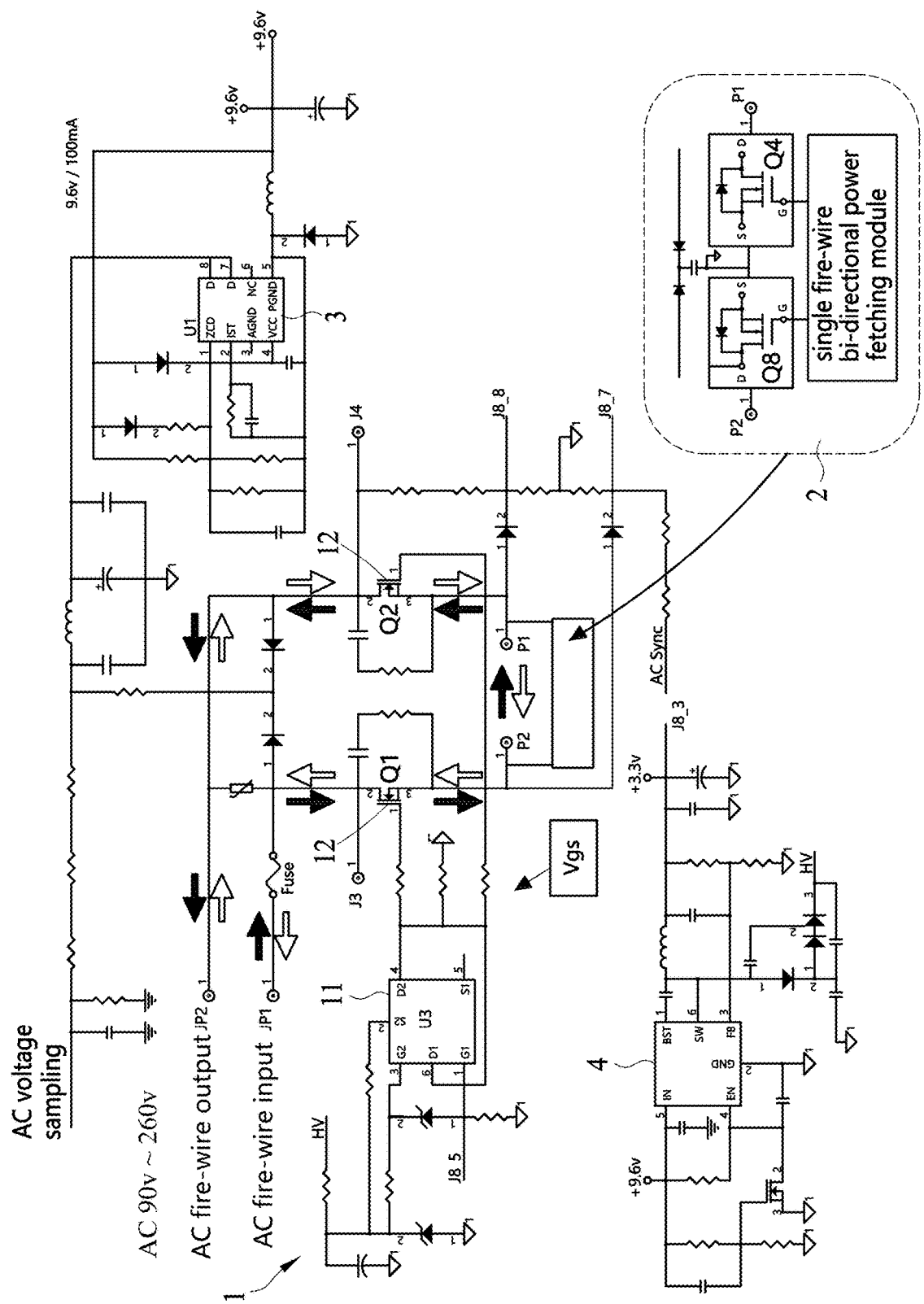
FIG. 4 is a circuit diagram of a single fire-wire bi-directional power fetching and dimmer control system in operation according to the present invention

Then, as shown in FIGS. 1 and 4, the operation principles of the single fire-wire bi-directional power fetching and dimmer control system are described as follows.

When the AC power supply is in a positive phase, a current flows in through the dimmer circuit 1 to the MOSFET Q1 of bi-directional power electronic components 12. Then, the current flows through P2 to reach MOSFETs Q8, Q4 of the single fire-wire bi-directional power fetching module 2. Subsequently, the current flows through MOSFET Q2 of the other bi-directional power electronic components 12, to be output to a dimming lamp 150. In addition, when the AC power supply is in a negative phase, a current flows in through the dimming lamp 150 to the MOSFET Q2 of the other bi-directional power electronic components 12. Then the current flows through P1 to the MOSFETs Q4, Q8 of the single fire-wire bi-directional power fetching module 2. Then, the current flows back to the AC power source through the MOSFET Q1 of the bi-directional power electronic components 12. In this process, both the MOSFETs Q8, Q4 of the single fire-wire bi-directional power fetching module 2 perform bi-directional power fetching for DC voltage of 12v at the same time.

At this time, the high side buck 3 connected across the two ends of MOSFET Q1, Q2 converts high voltage AC to low voltage DC of 12v. And this low voltage DC of 12v, together with the DC 12v fetched by the bi-directional power fetching mentioned above, are input to the DC to DC converter 4 respectively, to produce DC power of 18v for the dimmer driver 11 to use. The DC to DC converter 4 can also produce DC power of 3.3 v/450 mA, to meet the power demand of Wi-Fi, 5G; sensor 102, and a wireless communication module 101 requiring the same amount of power.

As shown in FIGS. 1, 5A to 5C, in the present invention, a single fire-wire bi-directional power fetching module 2 is added to a high side buck 3, to complement each other, so that the power fetched can be adjusted automatically, and its characteristics are described as follows.

1. The effective combination of circuits and module mentioned above allows it to perform Trailing Edge Dimmer in the sine wave curves. The dimmer cycle ratio is able to reach a range of 15% to 95%, and this may even reach 100% when it is necessary.

2. When the dimming cycle ration is greater than 50%, and while the dimmer circuit 1 is conducting, the single fire-wire bi-directional power fetching module 2 performs directly single fire-wire power fetching, and provides the power fetched to the system as a normal power supply, and the power fetched is also used for stable power output.

3. When the dimming cycle ratio is less than 50%, the high side buck 3 performs directly power fetching at buck voltage, and provides the power fetched to the system as a normal power supply, and the power fetched is also used for stable power output. The above descriptions are for illustration only, but the present invention is not limited to this.

4. Based on 2 and 3 above, in power fetching, the dimming lamp 150 is in a conducting state continuously without being turned off, to achieve low load lamp turn-on while performing power fetching. Besides, flickering of LED lamp and power saving lamp can be avoided.

In the present invention, a single fire-wire bi-directional power fetching module 2 is added to a high side buck 3 to complement each other, and to perform power fetching. Therefore, in addition to providing normal power supply to the system continuously, it is able to provide stable DC power output of at least 3.3v/450 mA, and that is quite sufficient for MCU microprocessor, Wi-Fi, 5G; or other devices such as sensor 102 and wireless communication module 101 requiring similar power, to overcome effectively the problem of single fire-wire distribution for a lamp control switch in a conventional household.

Presently in the world, 95% of conventional households utilize mechanical switch of single fire-wire distribution. In the future, when replacing the mechanical switch with an Internet of Things (IoT) dimmer switch making use of Wi-Fi, there is no need to add a Neutral line to produce a power fetching circuit, the circuit design of the conventional household can be used to provide the same function. In this way, the system of the present invention can be added to the conventional household directly, to be upgraded to an Internet of Things (IoT) intelligent household dimmer switch, in realizing energy saving effectively in households, schools and public buildings.

Finally as shown in FIG. 1, in the present invention, a rear end of the system can be connected to a dimming lamp 150 to regulate illumination. In practice, a motor 160 can be connected to adjust its rotation speed. In real production, the dimmer circuit 1, and the single fire-wire bi-directional power fetching module 2 can be formed integrally into an integrated circuit module. Or, alternatively, the dimmer circuit 1, the single fire-wire bi-directional power fetching module 2, the high side buck 3, and the DC to DC converter 4 can be formed integrally into an integrated circuit module, to facilitate its applications into various phase adjustments and controls.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A single fire-wire bi-directional power fetching and dimmer control system, comprising:
   a dimmer circuit, connected in series to a single fire-wire, the dimmer circuit includes at least a dimmer driver, and two connected bi-directional power electronic components, wherein, one of the bi-directional power electronic components is disposed on an input end of the single fire-wire, and the other bi-directional power electronic component is disposed on an output end of the single fire-wire, through using the two bi-directional power electronic components, both a positive wave AC and a negative wave AC are used to perform phase conduction adjustment, wherein the dimmer circuit is a neutral-wire-free dimmer circuit;
   a single fire-wire bi-directional power fetching module, connected in series to the dimmer circuit, and is disposed between the two bi-directional power electronic components, to perform single fire-wire power fetching when the dimmer circuit is conducting, the two bi-directional power electronic components are formed respectively by two separate high voltage high power MOSFETs, and the dimmer driver is an MOSFET dimmer driver, in which, a dimmer cycle ratio of the dimmer circuit is controlled to be in a range of 15% to 95%;
   a high side buck, connected in parallel to the dimmer circuit, with one end of the converter circuit disposed on the input end of the single fire-wire connected to one of the two bi-directional power electronic components, and with the other end of the converter circuit disposed on the output end of the single fire-wire connected to the other of the two bi-directional power electronic components, wherein the high side buck converter circuit is a full-bridge rectifier; and
   a DC to DC converter, with an input end of the converter for fetching power connected to the single fire-wire bi-directional power fetching module, and the high side buck; and with an output end of the converter for supplying power connected to the dimmer driver of the dimmer circuit, to perform single fire-wire bi-directional light dimming.

2. The single fire-wire bi-directional power fetching and dimmer control system as claimed in claim 1, wherein the dimmer circuit and the single fire-wire bi-directional power fetching module are formed integrally into an integrated circuit module.

3. The single fire-wire bi-directional power fetching and dimmer control system as claimed in claim 1, wherein the dimmer circuit, the single fire-wire bi-directional power fetching module, the high side buck, and the DC to DC converter are formed integrally into an integrated circuit module.

4. The single fire-wire bi-directional power fetching and dimmer control system as claimed in claim 1, wherein a dimmer cycle ratio of the dimmer circuit is controlled to be in a range of 15% to 100%.

5. The single fire-wire bi-directional power fetching and dimmer control system as claimed in claim 1, wherein the dimmer driver is connected to and controlled by an MCU microprocessor, such that the MCU microprocessor receives power supplied by the DC to DC converter of at least DC 3.3v/450 mA.

6. The single fire-wire bi-directional power fetching and dimmer control system as claimed in claim 5, wherein when the dimmer cycle ratio of the dimmer circuit is controlled to be greater than 50%, the single fire-wire bi-directional power fetching module performs single fire-wire power fetching directly under a condition of the dimmer circuit conduction, to provide normal power supply to the system; and when the dimmer cycle ratio of the dimmer circuit is controlled to be less than 50%, the high side buck performs power fetching under a condition of reduced voltage, to provide normal power supply to the system.

7. The single fire-wire bi-directional power fetching and dimmer control system as claimed in claim 5, wherein a wireless communication module is added to the MCU microprocessor, such that the wireless communication module is one of the following: a Blue Tooth wireless module, a Zigbee wireless module, a Z-wave wireless module, a RF2.4G, 3G, 4G, and 5G wireless module, a 433 MHz wireless module, and a Wi-Fi wireless web module.

8. The single fire-wire bi-directional power fetching and dimmer control system as claimed in claim 5, wherein the single fire-wire bi-directional power fetching module mainly includes: two series connected synchronous power fetching circuits, and an electronic switch connected thereto; the electronic switch is controlled by the MCU microprocessor, such that one of the two series connected synchronous power fetching circuits performs positive (+) phase AC power fetching, and the other one of the two series connected synchronous power fetching circuits performs negative (−) phase AC power fetching; each of the two series connected synchronous power fetching circuits includes: a synchronous rectifier outside power supply unit, a synchronous rectifier inside power supply unit, a synchronous AC voltage control unit, an FET-driven zero-crossing control unit, a synchronous load dynamic adjusting unit, and a synchronous zero-crossing AC power fetching unit; for a single fire-wire, bi-directional dynamic full-bridge type power fetching is performed twice in a cycle of AC, a duration of power fetching is regulated automatically depending on the load, to adjust automatically the compensation power.

9. The single fire-wire bi-directional power fetching and dimmer control system as claimed in claim 5, wherein a lamp body or a motor is disposed in a rear end of the dimmer circuit.

10. The single fire-wire bi-directional power fetching and dimmer control system as claimed in claim 5, wherein a sensor is added onto the MCU microprocessor, to receives signals to control the dimmer circuit to act.

* * * * *